US012729546B2

(12) United States Patent
DeWitt et al.

(10) Patent No.: US 12,729,546 B2
(45) Date of Patent: Sep. 8, 2026

(54) MODULAR MOLDING SYSTEM

(71) Applicant: Steiner Enterprises, Lafayette, IN (US)

(72) Inventors: Joshua E. DeWitt, Westfield, IN (US); Thomas P. Hicks, Lafayette, IN (US); Donald E. DeWitt, Syracuse, IN (US)

(73) Assignee: Steiner Enterprises, Lafayette, IN (US)

(*) Notice: Subject to any disclaimer, the term of this patent is extended or adjusted under 35 U.S.C. 154(b) by 156 days.

(21) Appl. No.: 18/655,470

(22) Filed: May 6, 2024

(65) Prior Publication Data

US 2025/0341103 A1 Nov. 6, 2025

(51) Int. Cl.

| | |
|---|---|
| ***E04F 19/04*** | (2006.01) |
| ***F21V 33/00*** | (2006.01) |
| ***F21Y 115/10*** | (2016.01) |

(52) U.S. Cl.

CPC ...... *E04F 19/0463* (2013.01); *E04F 19/0436* (2013.01); *F21V 33/006* (2013.01); *E04F 2019/0454* (2013.01); *F21Y 2115/10* (2016.08)

(58) Field of Classification Search

CPC .............. E04F 19/0463; E04F 19/0436; E04F 2019/0454; E04F 13/0733; E04F 19/022; E04F 19/0481; E04F 19/0486; E04F 2019/0422; F16B 5/126

See application file for complete search history.

(56) References Cited

U.S. PATENT DOCUMENTS

| | | | | |
|---|---|---|---|---|
| 5,001,877 A * | 3/1991 | Edwards | E04F 19/0436 | 403/295 |
| 5,359,817 A * | 11/1994 | Fulton | E04F 19/026 | 52/288.1 |
| 6,323,421 B1 * | 11/2001 | Pawson | H02G 3/0418 | 52/220.1 |
| 7,487,623 B2 | 2/2009 | Rodolfo et al. | | |
| 7,574,836 B2 * | 8/2009 | Wesolowska | E04F 19/04 | 52/220.1 |
| 7,958,685 B2 * | 6/2011 | Rowohlt | E04F 19/0436 | 52/287.1 |
| 8,495,844 B1 | 7/2013 | Johnson, Sr. | | |
| 8,522,498 B2 | 9/2013 | Picken | | |
| 9,175,483 B2 | 11/2015 | Pierret | | |
| 9,945,131 B2 | 4/2018 | Gosling et al. | | |

(Continued)

*Primary Examiner* — Gisele D Ford

(74) *Attorney, Agent, or Firm* — Maginot, Moore & Beck, LLP

(57) ABSTRACT

A modular molding system is provided for mounting at a wall-ceiling interface in a structure, such as an RV, and around a window opening in the structure. The system includes a mounting component and a trim component removable mountable to the mounting component. The mounting component is configured in one embodiment to be mounted to the wall-ceiling interface and in another embodiment to be mounted around a window opening. The molding system includes a functional component separate from the function of the molding system. In one embodiment, the functional component is an LED lighting strip and, in another embodiment, the functional component is a guide channel for a screen or sunshade of a window valence. A snap-fit engagement is provided between the mounting component and the trim component. The mounting component and the trim component are extruded plastic so that that the components can be cut to size as desired.

6 Claims, 10 Drawing Sheets

(56) References Cited

U.S. PATENT DOCUMENTS

| | | | | |
|---|---|---|---|---|
| 10,082,227 | B2 * | 9/2018 | Hoffman | H02G 3/0425 |
| 10,161,131 | B2 | 12/2018 | Maley et al. | |
| 11,608,681 | B2 | 3/2023 | Grife | |
| 2008/0202049 | A1 * | 8/2008 | Galas | E04F 19/0495 52/288.1 |
| 2011/0061300 | A1 * | 3/2011 | Fisher | E06B 9/42 160/90 |
| 2011/0090676 | A1 | 4/2011 | Sortor | |
| 2013/0091791 | A1 * | 4/2013 | Hardy | E04F 19/0495 52/288.1 |
| 2013/0235564 | A1 * | 9/2013 | Barcelos | E04F 19/0495 362/151 |
| 2014/0338276 | A1 | 11/2014 | Halischuk | |
| 2015/0204489 | A1 * | 7/2015 | Baello | F21V 33/006 362/231 |
| 2016/0053500 | A1 * | 2/2016 | Kawalec | E04F 19/0463 52/718.04 |
| 2021/0156154 | A1 * | 5/2021 | Coyle, Jr. | E04F 19/0463 |
| 2024/0263510 | A1 | 8/2024 | Crowley et al. | |

* cited by examiner

79

MODULAR MOLDING SYSTEM

BACKGROUND

This disclosure relates to molding systems, particularly for use in recreational vehicles. In a building or other form of dwelling, such as a recreational vehicle (RV), molding is provided at the joints within the structure of the dwelling. In particular, the molding is provided to conceal the seams between building surfaces. For instance, quarter-round is positioned at the joint between the floor and a vertical wall. Quarter-round can also be used at the joint between the ceiling and the vertical wall, but this type of molding lacks the aesthetic quality that is desired for such a visible joint location. Consequently, crown molding was developed that covered the ceiling-wall joint, but did so in an aesthetically pleasing manner. Rather than employ the simple round profile of a typical quarter-round molding piece, crown molding adds an architectural feature to the ceiling-wall joint.

For a fixed dwelling, such as a house, installing crown molding can be a time-consuming task. The crown molding must be accurately cut to fit along the length of a ceiling-wall interface. More significantly, the crown molding must be cut at a precise 3-dimensional angle to accommodate a corner. Then the crown molding piece must be nailed along its length to the underlying wall and/or ceiling.

While this time-consuming approach is suitable for a fixed dwelling, it is undesirable for a pre-fabricated structure that is produced in an assembly line. Thus, pre-fabricated housing or an RV are not well-suited for the conventional crown molding, due to the lengthy procedure required to install conventional crown molding. The same issue arises for other molding in the structure, such as molding around a window. Consequently, for an RV or other pre-fab dwelling structure, it is desirable to have molding components that are easily and rapidly installed.

Moreover, conventional molding components, such as crown molding, provide limited features. In other words, the typical crown molding piece simply provides an architectural interface at the joint between the ceiling and the vertical walls of the structure. For certain structures with limited surfaces for accommodating functional features, such as ambient lighting, it is also desirable to have a molding feature that incorporates those other functional features.

SUMMARY OF THE DISCLOSURE

In order to provide these desirable features, the present disclosure contemplates a modular molding system that is easy and quick to install and that includes the capability to integrate other functional features. In one embodiment, a modular molding system provides an aesthetic feature to a wall and/or ceiling structure that includes a mounting component including an extruded elongated base track defining a fastener panel configured to be fastened to a wall and/or a ceiling surface, at least one functional component providing a function different from the aesthetic feature of the molding system, and a trim component including an extruded elongated trim panel sized to conceal the mounting component when the trim panel is engaged to the mounting component and the mounting component is fastened to the wall and/or ceiling surface. A removable snap-fit connection is provided between the base track and the trim panel.

In one embodiment, the functional feature is an LED lighting strip mounted on the base track. The trim component, and in particular the interface between the trim component and the base track, is configured so that the trim component can be biased toward one building surface or another—i.e., toward the ceiling or the vertical wall in a ceiling-wall interface. The bias determines where light emitted from the LED lighting strip passes—along the ceiling or along the vertical wall.

In another embodiment, the functional feature is a channel structure configured to support and guide a window covering, such as a screen and/or a sunshade of a window valence. In this embodiment, the molding system is configured to be mounted around the perimeter of a window opening, such as a window in an RV.

DETAILED DESCRIPTION

Figure 1:
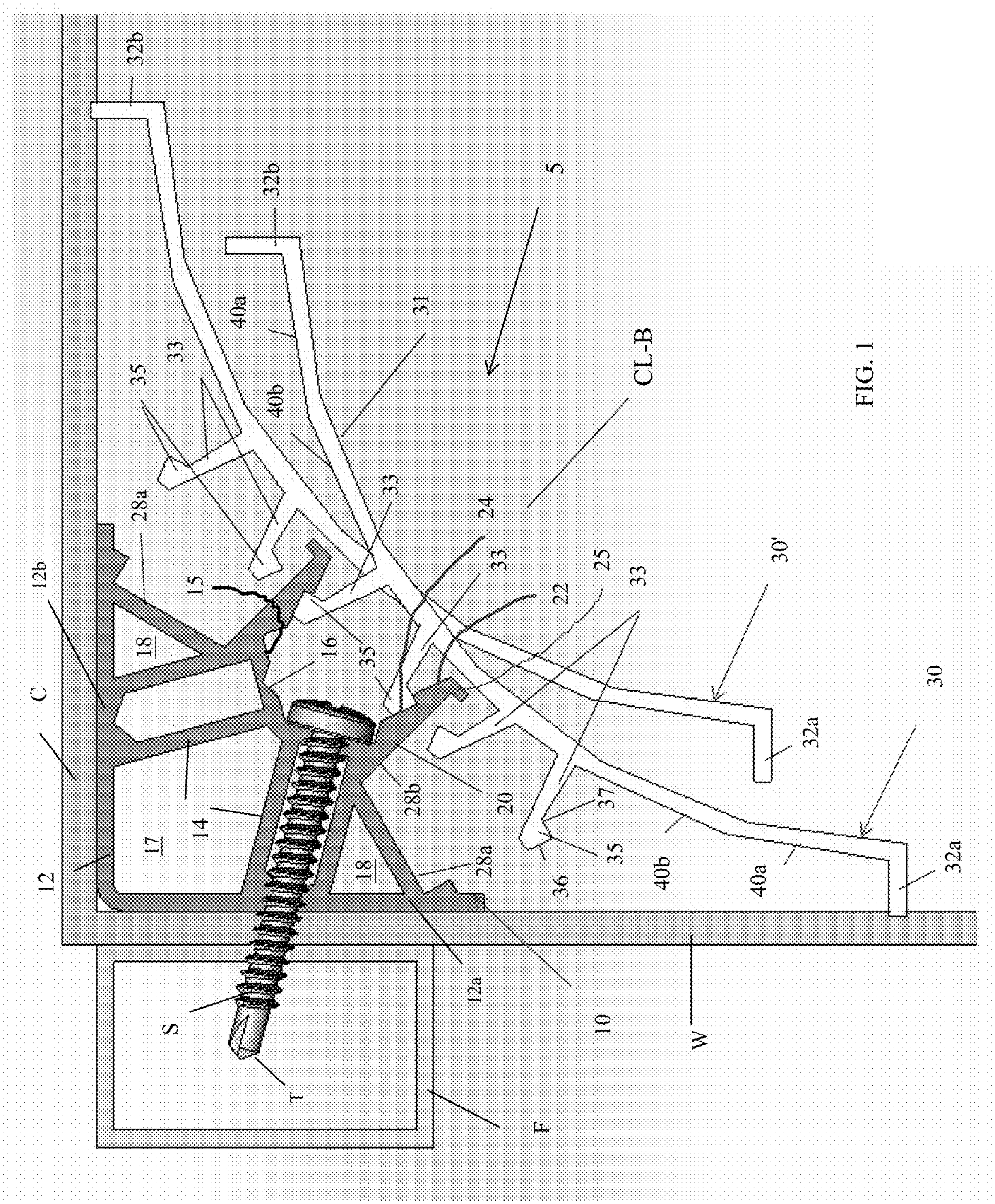
FIG. 1 is a side cross-sectional view of the modular molding system according to one embodiment of the present disclosure, with the molding system mounted at the joint between a ceiling and a vertical wall of a structure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 3:
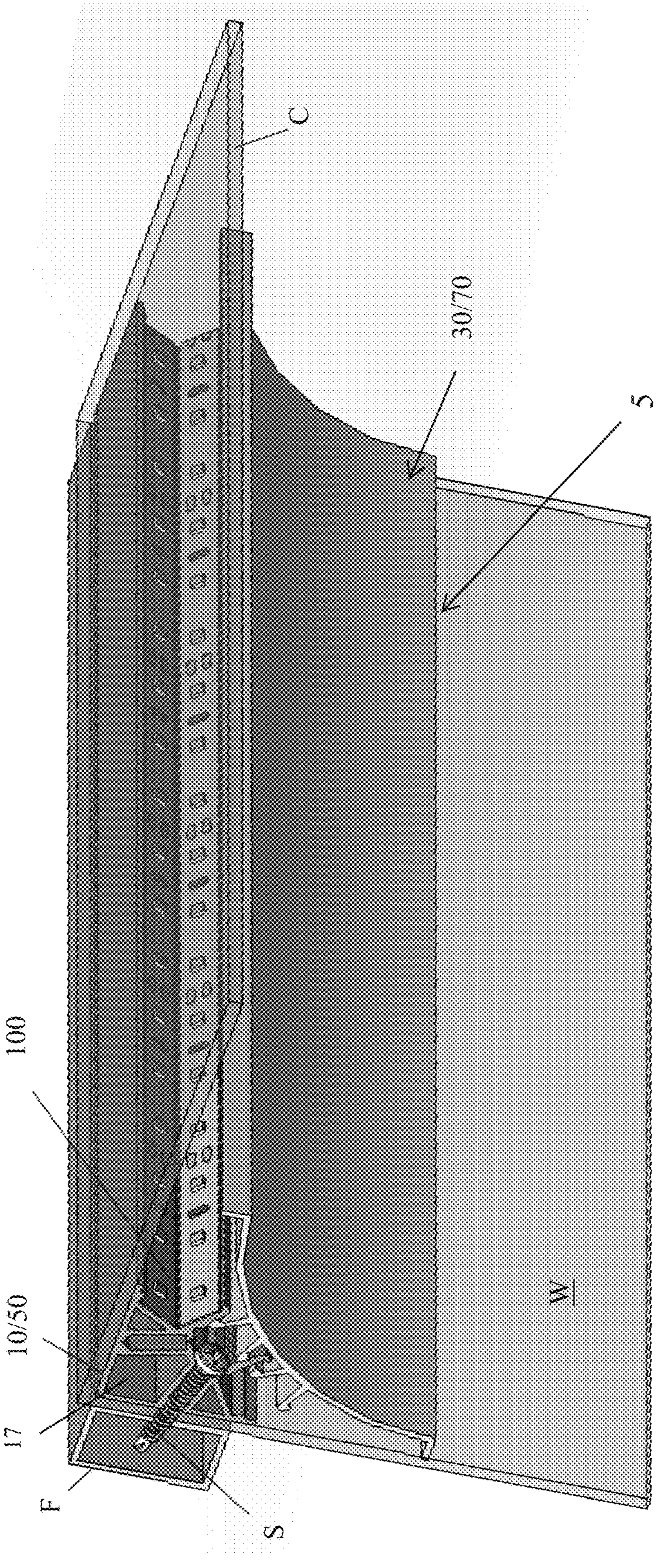
FIG. 3 is a perspective view of the modular molding system shown in FIG. 1.

A modular molding system 5 shown in FIG. 1 includes a mounting component 10 that is configured to be mounted at the joint between the surface of a ceiling C and a vertical wall W of a structure, such as a pre-fab house or an RV, and a trim component 30 that is configured to conceal the mounting component when it is mounted on the ceiling and/or wall surface. The mounting component 10 includes a base track 12 that is in the form of an elongated right-angle bracket with a horizontal fastener panel 12*a* configured to engage the ceiling C and a vertical fastener panel 12*b* configured to engage the vertical wall W. As shown in FIG. 3, the base track 12 is elongated and is configured to be cut to the length of the ceiling-wall joint. In a preferred embodiment, the base track is formed of an extrudable plastic, such as high-density polyethylene (HDPE). The base track 12 defines a pair of fastener guide channels 14, with one channel intersecting the horizontal fastener panel 12*a* and the other channel intersecting the vertical fastener panel 12*b* of the base track. Each channel includes a fastener surface 15, which defines a fastener guide notch 16. The guide notch 16 is configured to receive the tip T of a fastener, such as screw S, to guide the screw into a respective fastener guide channel 14.

The fastener can have a self-tapping tip T that is configured to pierce the associated fastener panel 12*a*, 12*b* of the base track 12, and to be driven into a wall frame or stud F behind the wall W, or similar structure behind the ceiling C. It is also contemplated that the fastener S could be configured to engage a conventional wall anchor behind the wall W or ceiling C. A plurality of fasteners S can be used to fasten the base track to the ceiling/wall joint, as shown in FIG. 3. In one alternative, the ends of fastener panels 12*a*, 12*b* can configured to receive staples to staple the base track to the wall and/or ceiling. In another alternative, the fastener panels 12*a*, 12*b* can be affixed directly to the surface of the wall and/or the ceiling, such as by an adhesive. In this alternative, a limited number of fasteners can still be used for security. It can be appreciated that the base track 12 is symmetrical relative to base centerline CL-B so that either fastener panel 12*a*, 12*b* can be positioned against either the wall W or the ceiling C.

It is contemplated that the fastener guide channels 14, fastener surface 15 and guide notch 16 extend continuously along the length of the elongated base track. This configuration allows positioning a fastener at any desired location along the length of the base track when installing the modular molding system 5. Alternatively, a discrete number of fastener guide notches 16 can be provided at predetermined locations along the length of the guide track. In that instance, it is further contemplated that the guide notches are in the form of discrete holes through the fastener surface 15, to accommodate a fastener without a self-tapping tip. The guide notch hole can be aligned with a corresponding hole in the fastener panels 12*a*, 12*b* of the base track, or the hole can be formed by drilling through the base track and into the ceiling or wall.

The base track 12 further defines an interior channel 17 along its length. As described herein, the channel can receive wiring for integrating a lighting system into the molding system 5. The base track can also define ancillary channels 18 that are separated from the main channel 17 by the fastener guide channel 14. The ancillary channels can be purely structural, although they could be used to receive additional wiring.

In one feature of the modular molding system 5, a resilient and removable snap-fit engagement is provided between the mounting component 10 and the trim component 30. For the mounting component, the snap-fit engagement is provided by a pair of retention arms 20 projecting outward from the fastener surface 15 of the base track 12. In one embodiment, the arms 20 are opposing and spaced apart, defining a channel that is generally centered along an axis bisecting the right-angle bracket configuration of the base track. In other words, the arms 20 and resulting channel are generally equidistant from each panel 12*a*, 12*b* of the base track. Each retention arm 20 includes a guide surface 22 on the facing surfaces of the opposing arms. The opposing guide surfaces diverge slightly from each other toward the ends of the respective arms. An engagement notch 24 is formed at an inboard end of each guide surface. In one embodiment, the engagement notch is near the midpoint of the length of each arm 20. The notch can be generally triangular in shape, as shown in FIG. 1.

The base track can be provided with generally flat mounting surfaces 28*a*, 28*b*. The surfaces can be used to mount functional elements, such as the functional elements 100 shown in FIGS. 2A-B. In one embodiment, the functional elements 100 can be an LED lighting strip, as shown in FIG. 3. The strip can be affixed to any number of the mounting surfaces 28*a*, 28*b* to create a desired lighting effect. Which mounting surface is used can depend on the orientation of the trim component 30, 70, as described herein. The wiring for the LED lighting strips can be directed through the interior channel 17. Access from the mounting surfaces to the interior channel can be provided by drilling through the mounting surface 28*a* and through the fastener guide channel 14 to enter the interior channel 17. It is contemplated that a battery pack can be integrated into the base track 12, and particularly within the wiring channel 17 for access at an end of the base track at an exterior corner, for instance. Alternatively, the battery pack can be disposed in a space between separate base tracks, with the trim component, described below, spanning the space to conceal the battery pack.

Figure 5A:
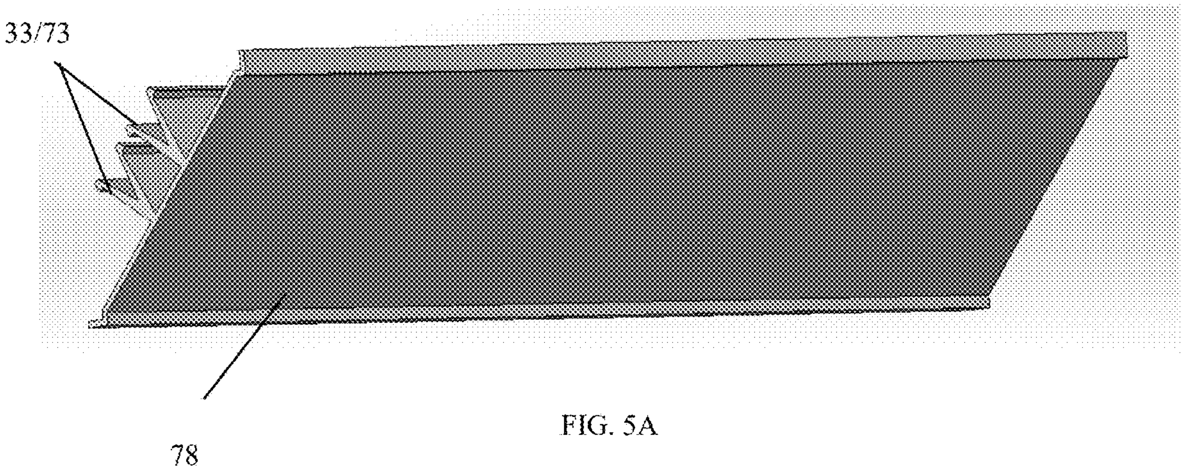
FIGS. 5A-5B are perspective and end views of a trim component of the modular molding system of the present disclosure.
Figure 5B:
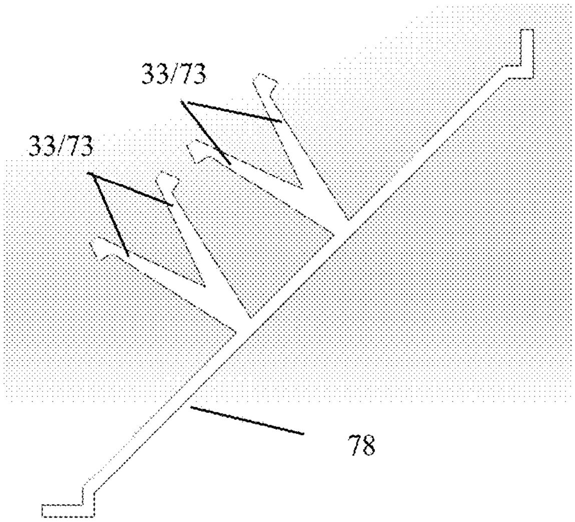
Figure 6A:
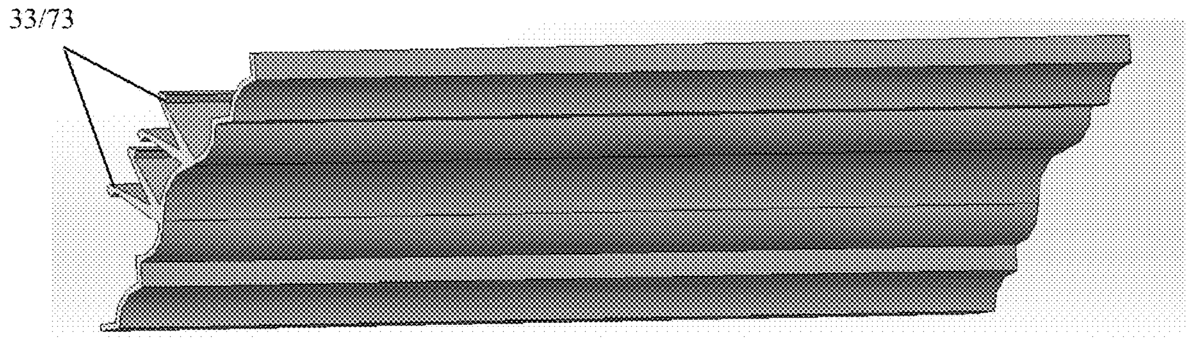
FIG. 6A-6B are perspective and end views of a trim component of the modular molding system of the present disclosure.
Figure 6B:
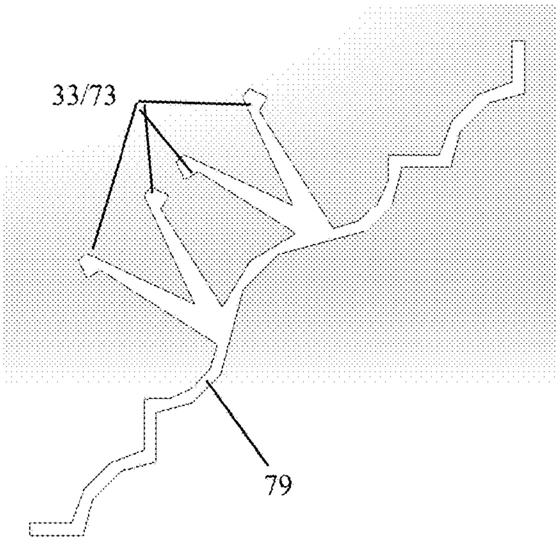

The modular molding system 5 further includes a trim component 30 that is configured to be adjustably and removably engaged to the base track. The trim component 30 includes an elongated trim panel 31 that is configured to be cut to a desired length relative to the length of the wall-ceiling joint that is receiving the molding system. As shown in FIGS. 1-3, the trim panel 31 can be a curved panel to provide a decorative aspect to the molding system. In other designs, the trim panel can be flat, like the trim panel 78 in FIGS. 5A, 5B, or wavy, like the trim panel 79 shown in FIGS. 6A, 6B. Other decorative configurations for the trim panel are contemplated. In a preferred embodiment, the base track is formed of an extrudable plastic, such as high-density polyethylene (HDPE).

The trim component 30 has a width along the elongated length of the panel, with the width sized to conceal the mounting component when the trim component is mounted thereon. The trim component includes an edge panel 32*a*, 32*b* at the opposite edges of width of the trim panel. In one embodiment, the edge panels extend inward and generally perpendicularly from the trim panel. As shown in FIG. 1, the edge panel 32*a* is arranged to contact the vertical wall W when the trim component 30 is mounted to the mounting component in a first position. In a second position, the trim component 30' is shifted upward when mounted to the mounting component so that the edge panel 32*b* is arranged to contact the ceiling C. This configuration of the trim panel 31 and edge panels 32*a*, 32*b* provide a gap between an edge panel of the trim component 30 and the corresponding wall W and ceiling C, for reasons described herein. In an alternative embodiment, the trim panel 30 can be configured so that both edge panels 32*a*, 32*b* contact the corresponding wall W and ceiling C at the same time when the trim component is mounted to the mounting component 10. In addition to providing an interface between the trim component and the wall or ceiling, the edge panels 32*a*, 32*b* add torsional stiffness to the elongated trim panel 31 to facilitate engagement of the trim component with the engagement component 10.

The resilient snap-fit engagement for the trim component 30 is provided by at least one pair of resilient prongs 33 projecting inward from the trim panel 31. Each prong terminates in an engagement head 35 which defines a sloped ramp surface 36. The prongs 33 diverge apart from each other so that the ramp surfaces 36 of the engagement heads 35 contact the outermost end of the guide surfaces 22 of the mounting component 10. The ramp surfaces 36 and guide surfaces 22 are configured for sliding contact. As the trim component is pushed toward the mounting component, the resilient prongs 33 deflect toward each other as the ramp surfaces slide along the guide surfaces. The engagement heads include a locking surface 37 that "clicks into" the engagement notches 24 of the retention arms 20. The engagement notches 24 can also be angled inward so that the force required to push the resilient prongs further into the mounting component is prohibitive. The end of the retention arms 20 can also include a support foot 35 that can contact the inside surface of the trim panel 31 to hold the panel in position on the mounting component.

Figures 2A, 2B:
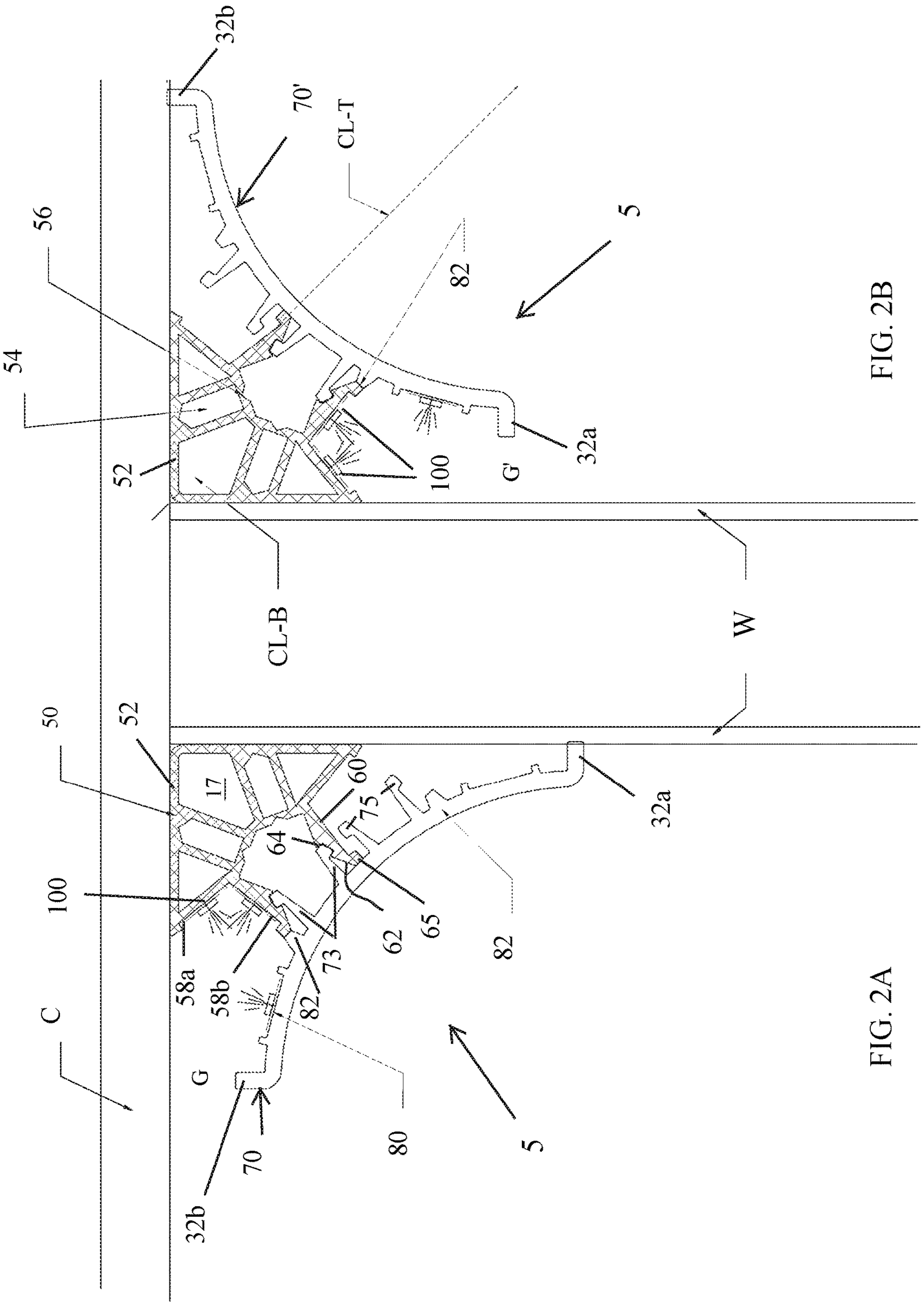
FIGS. 2A, 2B are a side cross-sectional views of a modular molding system according to another embodiment of the present disclosure, with the molding system mounted at the joint between a ceiling and a vertical wall of a structure, showing a trim component in different orientations.

As shown in FIG. 1, the trim component 30 includes two pairs of resilient prongs 33, offset on either side of the trim centerline CL-T (FIG. 2B) of the trim panel. It can be appreciated that the right-most pair of prongs 33 are engaged to the retention arms 20 with the trim component 30 in the position in which the edge panel 32*a* contacts the vertical wall W. Alternatively, the left-most pair of prongs can engage the retention arms with the trim component 30' in the position in which the edge panel 32*b* contacts the ceiling C. The trim component 30 thus provides for two decorative options-one in which there is a gap between the trim panel and the ceiling and the other in which there is a gap between the trim panel and the vertical wall. The benefits of this versatility are illustrated in FIGS. 2A, 2B in which the orientation of the trim component 70 provides a gap G adjacent the ceiling C and the orientation of the trim component provides the gap G' adjacent the vertical wall W. In FIG. 2A, the functional components 100 are an LED lighting strip that is mounted to one or more of the mounting surfaces 58*a*, 58*b* on the mounting component 50 and the interior mounting surface 80 of the trim component 70. (The trim component 30 includes similar interior mounting surfaces 40*a*, 40*b* that can support the functional components 100). The LED lighting strips 100 with the trim component 70 direct the light through the gap G between the trim component 70 and the ceiling C. Alternatively, as shown in FIG. 2B, when the trim component 70' is shifted upward, the LED lighting strips 100 can direct light through the gap G' between the trim component 70' and the vertical wall W. It can be appreciated that from an aesthetics standpoint, the position of trim component 70 in FIG. 2A can provide "mood lighting" along the ceiling-wall interface. The position of trim component 70' in FIG. 2B can combine an aesthetic with a functional attribute, such as in the manner of a night light against a vertical wall of a room.

The base track 52 of the mounting component 50 shown in FIGS. 2A, 2B is similar to the trim component 30. The retention arms 60 are similar to the retention arms 20 to engage the resilient prongs of the trim component and include a guide surface 62 similar to the guide surface 22. The feet 65 of the mounting component 50 can be configured such that one of the feet contacts the inside surface of the trim component 70, while the other foot is offset from the surface. In this embodiment, the trim component 70 includes ridge 82 adjacent a first set of resilient prongs 73 that projects from the inside surface of the trim component a sufficient height to be contacted by the other foot of the mounting component. A second ridge 82 is provided adjacent the second set of resilient prongs 73. Like the prongs 23, the prongs 73 include an engagement head 75 configured to slide along the guide surface 60 for engagement within the notch 64. It can be appreciated that the two feet 65 and one of the ridges 82 provide a stable engagement of the trim component 70 to the mounting component 50 when the engagement heads 75 are "clicked into" the engagement notches 64.

Figures 4A, 4B, 4C, 4D:
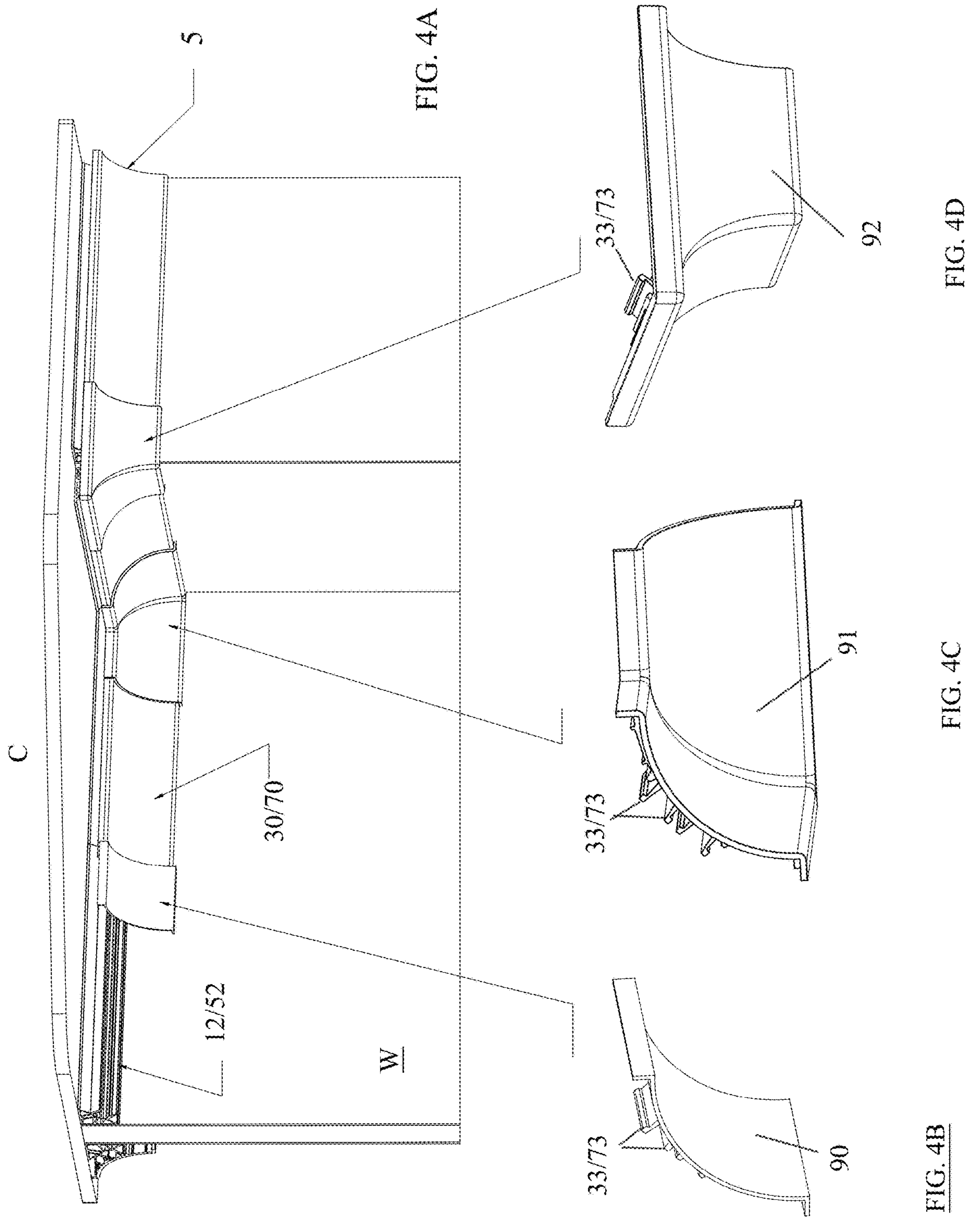
FIG. 4A is a perspective view of the modular molding system of the present disclosure mounted on a wall with interior and exterior corners.
FIGS. 4B-4D are perspective views of components of the modular molding system show in FIG. 4A.

The modular molding system 5 of the present disclosure contemplates a mounting component 10/50 and a trim component 30/70 that can be cut to size to fit any wall-ceiling interface. It can be appreciated that the mounting component can extend almost the entire length of the wall-ceiling interface. However, at an interior corner, two mounting components meet at the corner, requiring one mounting component to shortened to avoid interference between the two components. At an exterior corner, the mounting components can both extend to the corner without interfering with each other. However, the 3-dimensional aspect of the trim components complicate the interface between adjacent trim components at an interior and exterior corner. Thus, the molding system 5 can include corner pieces that accommodate interior and exterior corners of the wall-ceiling interface, as shown in FIG. 4A. For instance, an interior corner piece 91 includes resilient prongs 33/73 configured to engage the retention arms 20/60 of the mounting component 10/50 on both sides of the corner. Similarly, exterior corner piece 92 includes resilient prongs 33/73 arranged to engage the mounting components on both sides of the corner. The corner pieces can be configured to slightly overlap the ends of the trim components 30/70 to create a smooth appearance. An intermediate connector trim component 90, shown in FIG. 4B, can be provided to interface with opposing ends of the trim components 30/70 that are shorter than the length of the wall/ceiling interface. The connector trim components 90 may be provided at a particular spacing for decorative purposes, or can be provided to bridge the space between trim components on a wall-ceiling interface that is too long for a single mounting component and trim component combination.

Figure 7:
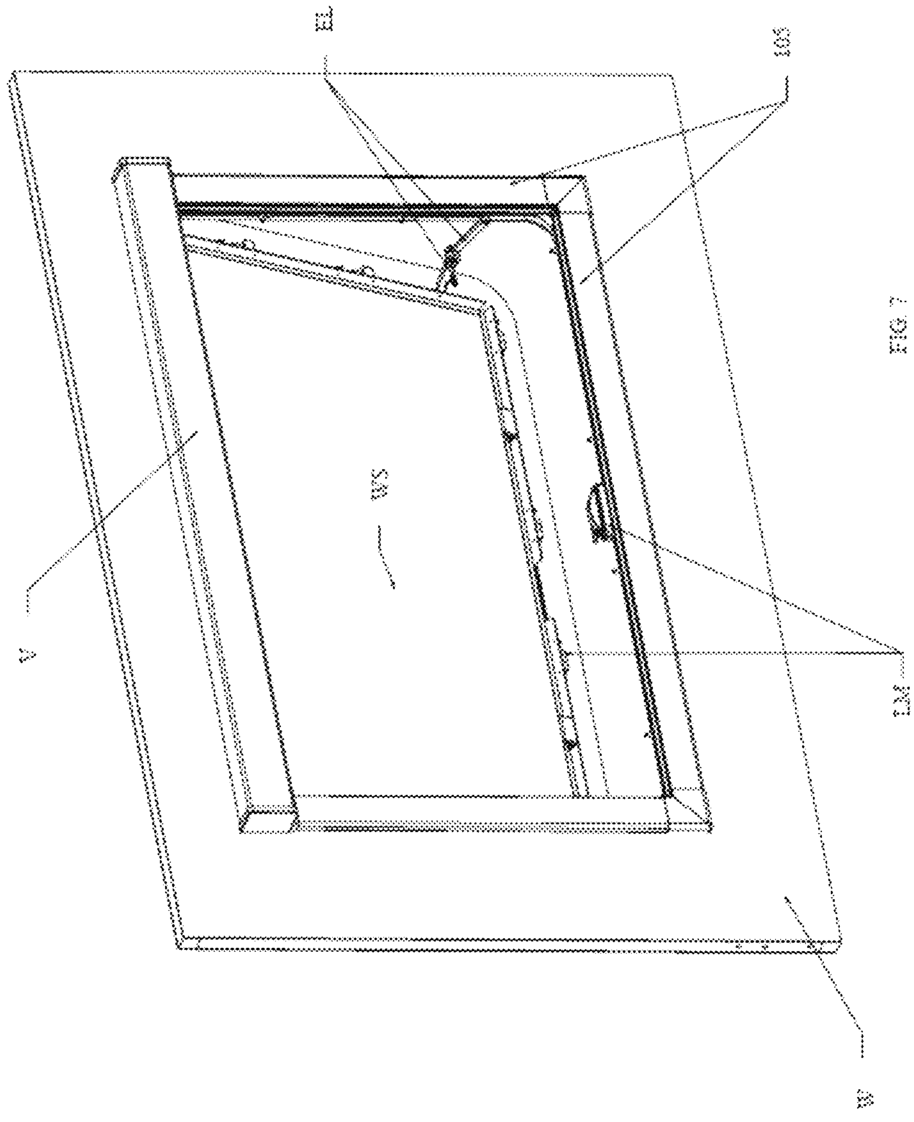
FIG. 7 is perspective view of a window system for a recreational vehicle incorporating a modular molding system according to one embodiment of the present disclosure.

In another aspect of the present disclosure, a modular molding system can be provided for locations in a building or vehicle other than at a wall joint. A modular molding system 105 is configured to be mounted around a window assembly, such the window assembly for an RV shown in FIGS. 7-8. The assembly includes a window system WS mounted within an opening in a wall W of the RV. The window system is provided with an egress lever mechanism EL and a latch mechanism LM between the wall and the window system WS. A valence assembly V is provided that houses at least one window covering, such as a screen SC and a sunshade SS, behind a valence trim VT. A pair of valence brackets VB are mounted to the wall W and support the valence trim, screen, sunshade and end caps VC. The screen SC and sunshade SS are provided on rollers so that the screen and/or shade can be pulled down to cover the window system WS, or retracted upward into the valence V in a conventional manner. However, it is desirable for the lateral edges of the screen and shade to be constrained, particularly for a window system in a moving RV.

Figure 9:
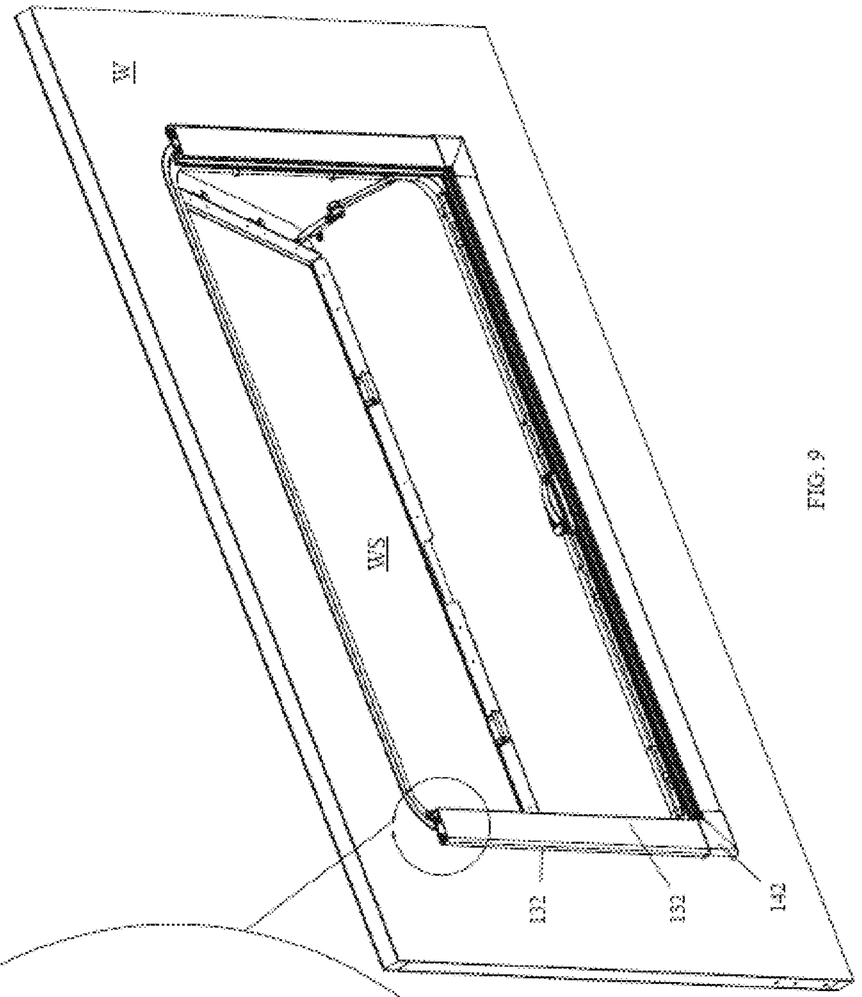
FIG. 9 is a perspective view of the window system of FIG. 7, shown with the valence removed.
Figure 10:
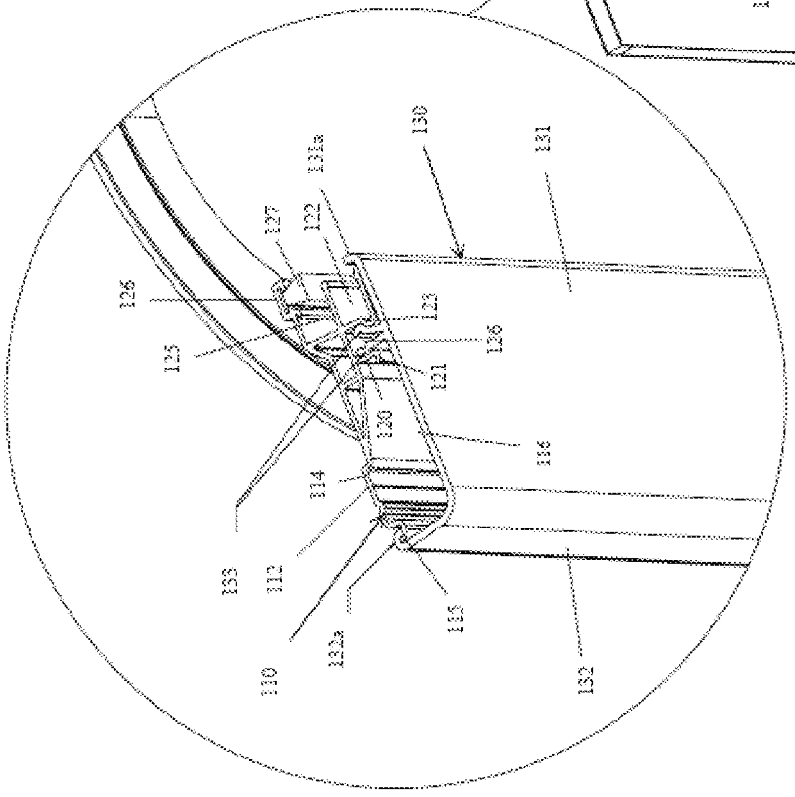
FIG. 10 is an enlarged perspective view of the modular molding system shown in FIG. 9.

The present disclosure provides a window molding system 105 that encircles the side and bottom extents of the window opening O in the wall W, as best seen in FIG. 9. It is understood that the valence V, and particularly the valence trim VT, extends along the upper extent of the window opening O. As shown in FIG. 10, the modular window molding system 105 includes a mounting component 110 and a trim component 130, similar to the molding system 5 described above. The mounting component 110 includes an elongated base track 112 that is configured to be mounted to the wall W around the window opening O. Like the base track 10, the base track 112 is an elongated extruded plastic component that can be cut to the desired size to fit the window opening. The base track includes a fastener panel 114 that can be used to fasten the base track to the wall. The fastener panel can be provided with spaced apart openings to receive wall fasteners, such as the screw S described above, or other wall anchors capable of fixing the base track to the wall, such as staples. Alternatively, the fastener panel 114 can be fixed to the wall with an adhesive, although this approach limits the ability to remove the window molding system 105.

The outboard edge 115 of the base track 112 defines an edge hook used for mounting the trim component 130 as described herein. The inboard edge of the base track defines functional elements, and particularly elements used to align and guide the sunshade and screen components. Thus, in one embodiment, the inboard edge of the base track 112 defines a sunshade channel 122 that is arranged to face inward across the window opening so that the side edge of the sunshade SS can be seated and slide within the channel. The base track further defines a screen channel 125 between the sunshade channel 122 and the fastener panel 114. The screen channel 125 is arranged parallel to the sunshade channel so that the side edge of the screen SC can be seated and slide within the channel. Like the molding system 5, the window molding system 105 combines a separate functional element with the decorative trim component. In this embodiment, the functional component includes the guides for the window screen and shade.

The base track 112 includes features for engaging the trim component 130. The edge hook 115 is one component of the engagement feature. Another component of the engagement feature is a retention arm 120 that is provided adjacent the inboard edge of the track. The retention arm 120 defines a guide bead 121 that combines with a guide bead 123 defined by the outboard end of the sunshade channel 122, as shown in FIG. 10. The two guide beads 121, 123 define an engagement channel 126 therebetween.

The trim component 130 includes an elongated trim panel 131 that can be cut to size, like the trim panel 31. The inboard edge of the trim panel 131 defines an engagement edge 131*a* that is bent inward to wrap around the inboard end of the sunshade channel 122. The outboard side of the trim panel 131 includes a side panel 132 that is angled inward, preferably at a perpendicular angle. The side panel 132 terminates in an edge hook 132*a* that is configured for mating engagement with the edge hook 115 of the base track. Like the trim panel 31, the trim panel 131 includes a pair of resilient prongs 133 projecting inward from the inner surface of the trim panel. The resilient prongs are arranged to be pressed between the guide bead 121 on the retention arm 120 and the guide bead 123 of the base track 112, to provide the resilient removable snap-fit connection between the mounting component and the trim component. In particular, the trim panel 131 is mounted on the base track by first engaging the edge hook 132*a* of the trim panel with the edge hook 115 of the base track. This engagement extends along the entire length of the trim panel and serves as a fulcrum point for pivoting the trim panel 131 toward the inboard end of the base track. As the trim panel is pivoted, the resilient prongs 133 contact the guide beads 121, 123, causing the prongs to deflect towards each other until the prongs are fully seated within the engagement channel 126. The resilient prongs 133 exert a spring force to push the prongs outward into frictional engagement with the engagement channel 126. The guide beads 121, 123 also help retain the prongs within the engagement channel. In this position, the engagement edge 131*a* of the trim panel wraps around the end of the sunshade channel 122 to provide a uniform appearance of the trim component, effectively concealing the mounting component 110.

The base track 112 can also define a T-slot 126 inboard of the screen channel 125. The T-slot can receive a guide 127 mounted to the lower end of the screen that can provide some rigidity to the screen.

Figure 8:
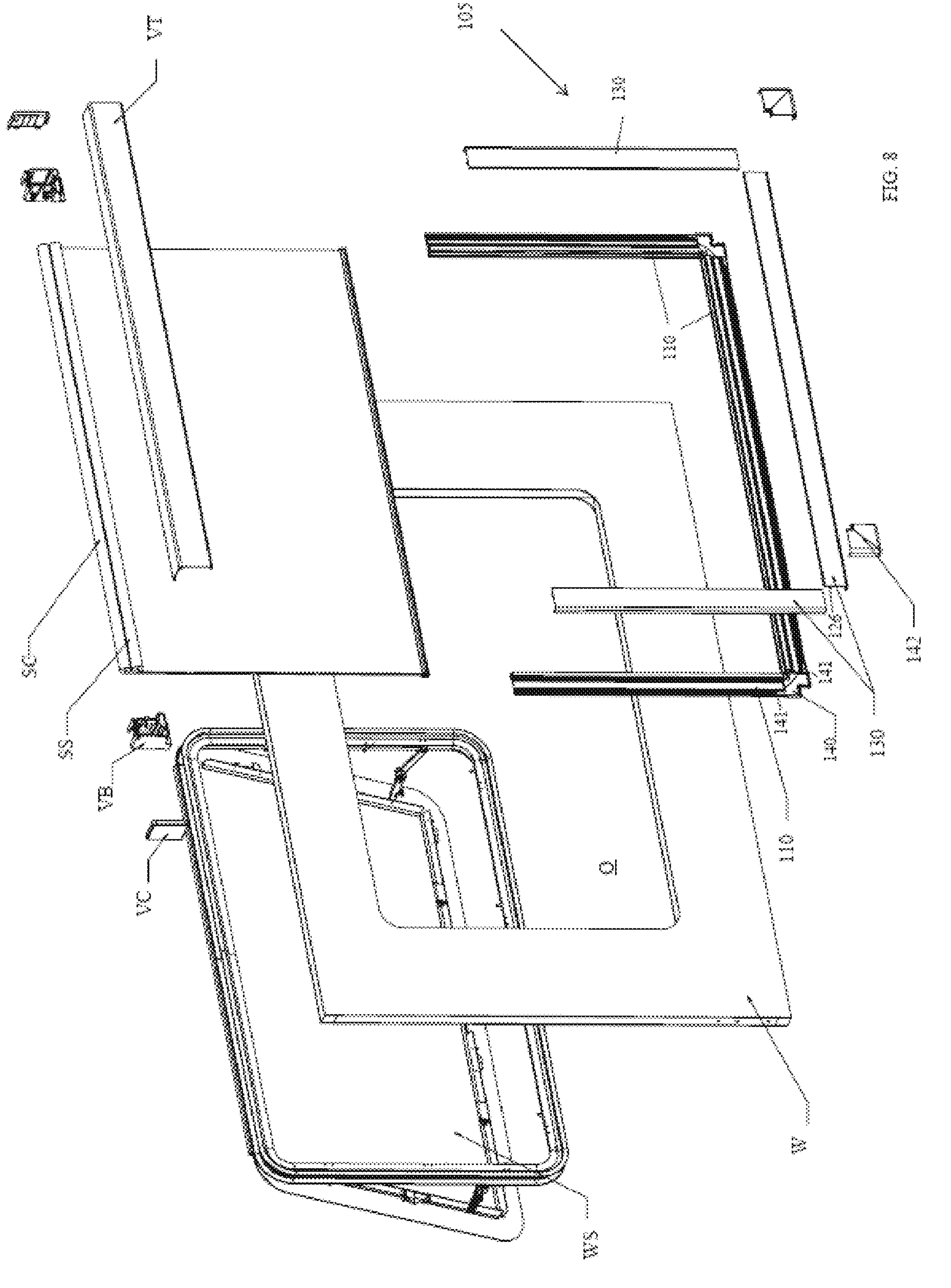
FIG. 8 is an exploded view of the window system shown in FIG. 7.

As shown in FIG. 8, the window molding system includes a mounting component 110 on the opposite sides of the window opening and along the bottom of the window opening O. The mounting components 110, along with the associated trim components 130, are cut to a length that avoids overlap between the ends of the mounting components at the corner of the window opening. A track connector 140 can be provided at each corner to connect one side mounting component with the bottom mounting component. The rack connector can be fastened to the base track of each mounting component 110 by fasteners 141, such as screws 141. It is contemplated that the three mounting components 110 connected to each other by a pair of track connectors 140 can be mounted as a complete assembly on the wall W around the window opening. The corresponding trim components 130 can then be mounted on the base tracks. Corner pieces 142 can complete the window frame assembly.

The base track 112 includes a surface 116 that can be used to support an additional functional component. For instance, the functional component can be an LED lighting strip, such as the lighting strip 100. Openings can be provided in the side panel 132 so that the lighting strip can add to the ambiance around the window system WS.

Figure 11:
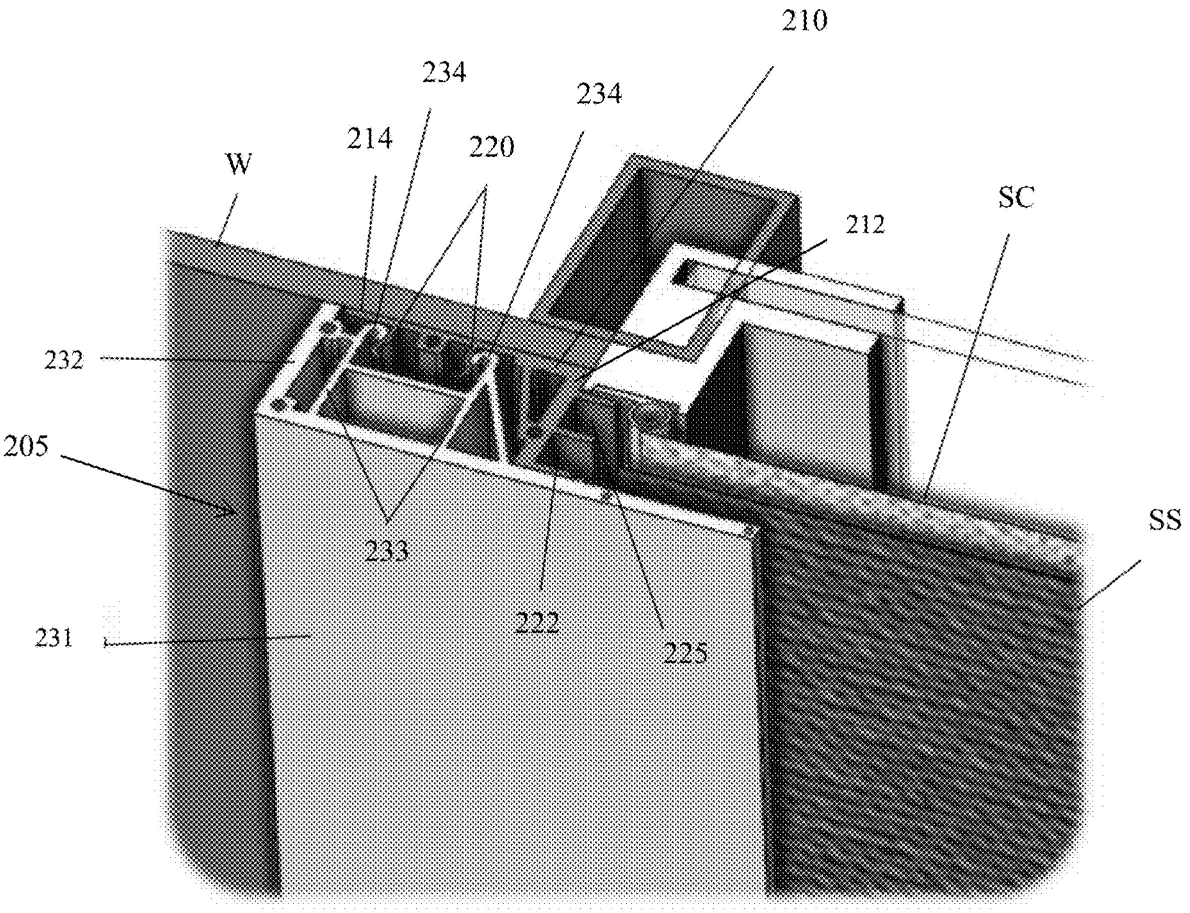
FIG. 11 is a top perspective view of an alternative embodiment of a modular molding system for a window system.

An alternative modular window molding system 205 is shown in FIG. 11. The mounting component 210 includes an elongated base track 212 with a fastener panel 214 configured to be mounted to the wall W in the manner described above. The base track defines a pair of resilient retention arms 220 projecting outward from the fastener panel. The inboard portion of the base track defines a sunshade channel 222 and a screen channel 225 to receive the sunshade SS and screen SC as described above.

The molding system 205 further includes a trim component 230 that includes a trim panel 231 with a side panel 232. The trim panel 231 includes a pair of prongs 233 projecting form the inner surface of the panel. The prongs terminate in a bead 234 that is configured to bear against the end of the resilient retention arms 220 when the trim component is added to the system. Unlike the prior embodiments, the retention arms on the base track are resilient to flex towards each other as the prongs 233 are pushed toward the fastener panel 214, to form the removable snap-fit connection between the mounting component and the trim component. In another modification from the window molding system 105, the trim panel 231 is configured to extend across part of the window opening, rather than terminating at the sunshade and screen channels 222, 225.

It is contemplated that the components of the modular molding systems disclosed herein can be extruded and provided in a range of conventional lengths. The components can be cut to length at the installation site. In one specific embodiment, the components are formed of a high-density polyethylene. The trim components can be provided in a range of colors for aesthetic appeal.

The functional component 100 for the molding systems disclosed herein provide a function in addition to the aesthetic function achieved by the trim component. Thus, in any of the molding systems disclosed the functional component can be a device or devices other than the LED lighting strip and sunshade/screen channels described above. For instance, the functional component can be a security system or even part of a sound system. The functional component could also be part of a motorized system to raise and lower the sunshade/screen in a window system.

The present disclosure should be considered as illustrative and not restrictive in character. It is understood that only certain embodiments have been presented and that all changes, modifications and further applications that come within the spirit of the disclosure are desired to be protected.

What is claimed is:

1. A modular molding system for providing an aesthetic feature to a wall and/or ceiling structure, comprising:

a mounting component including;

an elongated base track configured to be seated at the interface between a vertical wall surface and a ceiling surface, and including a vertical fastener panel configured to engage said vertical wall surface and a horizontal fastener panel configured to engage said ceiling surface; and at least one functional component providing a function different from the aesthetic feature of the molding system;

a trim component including an elongated trim panel sized to conceal the mounting component when the trim panel is engaged to the mounting component and the mounting component is fastened to the wall and/or ceiling surface, wherein the trim component has a width along the elongated trim panel and includes an end panel at each opposite edge of said width, each end panel extending inward and generally perpendicular from said trim panel; and a removable snap-fit connection between the base track and the trim panel, wherein the removable snap-fit connection includes:

a pair of retention arms defined by the base track and projecting outward from said fastener panel;

a first pair of resilient prongs projecting from an inner surface of the trim panel, said first pair of resilient prongs configured to be deflected relative to each other upon selective snap-fit engagement with the pair of retention arms, thereby exerting a spring force to hold the prongs in engagement with the retention arms; and a second pair of resilient prongs projecting from said inner surface of the trim panel and spaced apart from said first pair of resilient prongs, said second pair of resilient prongs configured to be deflected relative to each other upon selective snap-fit engagement with the pair of retention arms, thereby exerting a spring force to hold the prongs in engagement with the retention arms, wherein said first pair of resilient prongs is arranged so that the end panel at a first one of said opposite edges is in contact with said vertical wall surface when the first pair of resilient prongs are engaged with the pair of retention arms, and the end panel at a second one of said opposite edges is spaced apart from said ceiling surface to define a first gap; and wherein said second pair of resilient prongs is arranged so that the end panel at a second one of said opposite edges is in contact with said ceiling surface when the second pair of resilient prongs are engaged with the pair of retention arms, and the end panel at said first one of said opposite edges is spaced apart from said vertical wall surface to define a second gap.

2. The modular molding system of claim 1, wherein:

the base track defines at least two mounting surfaces separate from the fastener surface, a first one of said mounting surfaces arranged to align with said first gap, and a second one of said mounting surfaces arranged to align with said second gap; and the functional component includes an LED lighting strip configured to be mounted on any of said at least two mounting surfaces, said LED lighting strip configured to generate light to pass through one of said first gap and said second gap depending on the arrangement of the trim component on the mounting component.

3. The modular molding system of claim 1, wherein:

the base track defines a mounting surface separate from the fastener surface; and the functional component includes an LED lighting strip configured to be mounted on said mounting surface.

4. The modular molding system of claim 3, wherein said base track defines a wiring channel for receiving wiring associated with said LED lighting strip.

5. The modular molding system of claim 4, wherein:

said elongated base track defines an elongated fastener channel extending from each of said vertical and horizontal fastener panels, each elongated fastener channel configured to guide an elongated fastener to the corresponding fastener panel; and said fastener channels and said fastener panels defining said wiring channel.

6. The modular molding system of claim 1, wherein said elongated base track defines an elongated fastener channel extending from each of said vertical and horizontal fastener panels, said elongated fastener channel configured to guide an elongated fastener to the corresponding fastener panel.

* * * * *